United States Patent [19]
Duhaime et al.

[11] Patent Number: 5,901,879
[45] Date of Patent: May 11, 1999

[54] PRECISION LIQUID DISPENSER DEVICE

[76] Inventors: Richard Duhaime, 2192 Croissant Montrose, St-Lazare, Quebec, Canada, J7T 2G7; Serge Duhaime, 472 Lotbinière, Vaudreuil, Quebec, Canada, J7V 8P2; Normand Boudreau, 351 Dubicentennaire, Vaudreuil, Quebec, Canada, J7V 8C3

[21] Appl. No.: 08/953,716

[22] Filed: Oct. 17, 1997

[51] Int. Cl.⁶ .................................................. G01F 11/00
[52] U.S. Cl. ................................................. 222/1; 222/67
[58] Field of Search ........................... 222/56, 67, 185.1, 222/504, 1

[56] References Cited

U.S. PATENT DOCUMENTS

| | | | |
|---|---|---|---|
| 4,561,566 | 12/1985 | Slobodnik . | |
| 4,597,507 | 7/1986 | Rosenblum et al. . | |
| 4,660,856 | 4/1987 | Knapp et al. | 222/56 |
| 4,958,747 | 9/1990 | Sheets | 222/67 |
| 5,040,699 | 8/1991 | Gangemi . | |
| 5,368,197 | 11/1994 | Sutera | 222/67 |

*Primary Examiner*—Philippe Derakshani
*Attorney, Agent, or Firm*—Francois Martineau

[57] ABSTRACT

The dispenser device of the invention comprises a liquid storage tank overlying an intermediate chamber partially filled with liquid. The top storage tank is fluidingly linked to the intermediate chamber, and a first valve controls the liquid flow under the gravity force from the top tank into the intermediate chamber. The intermediate chamber comprises on its bottom wall an outlet port for allowing liquid to be dispensed therethrough under the gravity force and under the pressure of the overlying liquid, the liquid flow through the chamber outlet port being controlled by a second valve. A small computer is linked to the first and second valves and to a float gauge floating on the liquid located inside the intermediate chamber. Thus, the computer detects by means of the float gauge any variation of the level of liquid inside the intermediate chamber. In use, the data concerning the precise quantity of liquid which is desired is entered into the computer. The computer sends a signal to the second valve to allow liquid flow during a precise time period out of the intermediate chamber, this liquid being collected in a suitable receptacle.

11 Claims, 1 Drawing Sheet

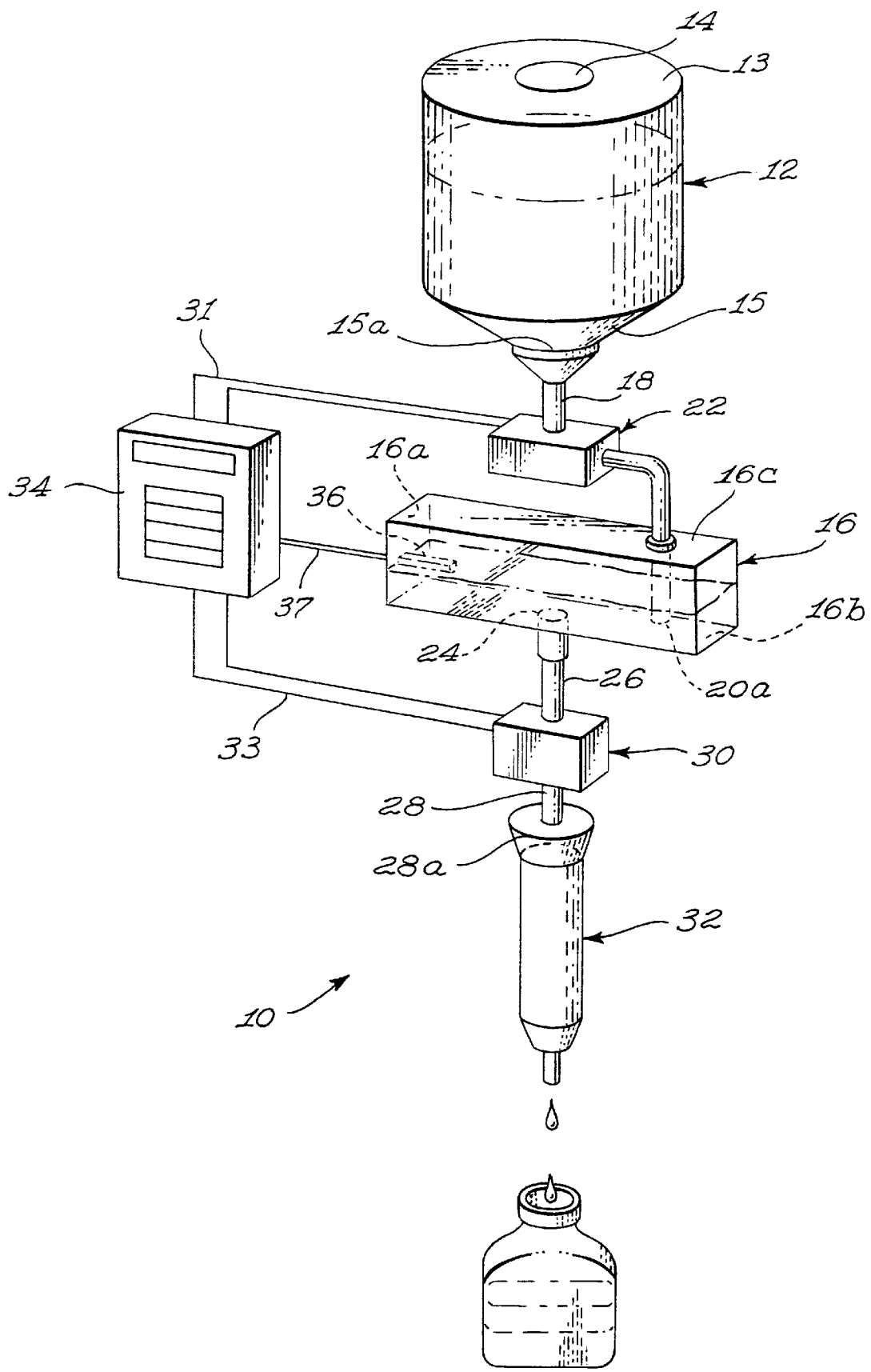

PRECISION LIQUID DISPENSER DEVICE

TITLE OF THE INVENTION: PRECISION LIQUID DISPENSER DEVICE

1. Field of the Invention

The present invention relates to a dispenser for dispensing a precise amount of liquid.

2. Background of the Invention

It is known to provide a liquid dispenser which is electronically controlled so as to meter the quantity of liquid dispatched by the dispenser into a proper receptacle. Such an electronically controlled dispenser is shown in U.S. Pat. No. 4,561,566 issued in 1985 to L. Slobodnik. This patent comprises a number of storage containers which automatically release, upon electronical command from liquid metering sensors, respective metered quantities of liquid into a mixing tank.

Many issued American patents include devices which comprise metering sensors or devices which help to measure a relatively precise quantity of liquid. The problem with these devices is that they are not designed to release extremely precise quantities of liquid. Indeed, the pressure applied on the liquid in the initial storage containers will vary depending on whether the storage tank is full or only partially full. Indeed, especially in the case of overlying storage tanks which feed the underlying mixing or receiving tank under the gravity force, the level of fullness of the storage tank will result in a different pressure being applied on the liquid being released therefrom. Thus, the speed at which the liquid is dispensed into the mixing tank will vary. More or less liquid may be dispensed into the receiving tank upon the sensor detecting that the correct quantity of liquid has been dispensed. This variation of the quantity of liquid may be very small, but it may be rather important when only small quantities of liquid are measured. This is especially true in the field of pharmacology, where the concentration of the medication comprising a certain quantity of liquid must be very precisely controlled, for ensuring proper dosage concentration levels.

OBJECTS OF THE INVENTION

It is an important object of this invention to provide a liquid dispensing device that allows precise quantities of liquid to be dispensed, notably by controlling the hydrostatic pressure parameter which is applied on the dispensed liquid.

It is another object of this invention to provide a simple and inexpensive liquid dispensing device.

SUMMARY OF THE INVENTION

In accordance with the objects of the invention, there is disclosed a liquid metering and dispensing device for dispensing a precisely metered volume of liquid into a receptacle for diluting a solid compound at a specified dosage, said device comprising: a) a storage tank, for holding a provision of the liquid, and having a first outlet port and a liquid supply intake port; b) an intermediate chamber, having an inlet fluidingly connected to said storage tank outlet port, and a second outlet port for dispensing liquid into the receptacle; c) first biasing means for biasing the liquid from said storage tank through said first outlet port into said intermediate chamber; d) second biasing means for biasing the liquid out of said intermediate chamber through said second outlet port and into the receptacle; e) a first valve member, for controlling the liquid flow between said storage tank and said intermediate chamber; f) a second valve member, for controlling the liquid flow between said intermediate chamber and said receptacle; g) monitoring means, for monitoring the volume of liquid in said intermediate chamber while liquid dispensing flow occurs; and h) valve actuating means, operatively connecting said monitoring means to said first and second valve members for sequential opening and closure of said first and second valve members, responsively to liquid level fluctuations detected by said monitoring means upon opening of said second valve members;

wherein a precisely metered volume of liquid can be dispensed by energizing said actuating means to open sequentially said valve members, and by maintaining a constant liquid pressure and volume in said intermediate chamber resulting from the monitoring of the liquid therein which allows liquid refill of said intermediate chamber from said storage tank.

Preferably, said monitoring means includes a buoyant gauge located in said intermediate chamber and movingly responsive to the level of liquid therein. Then, said monitoring means could further comprise a data processing unit, electronically connected to said buoyant gauge, actuating means, and to said first and second valves, for automatically energizing said actuating means for controlling said second valve and consequently the quantity of liquid dispensed by said intermediate chamber, and for simultaneously automatically controlling said first valve according to the signal of said monitoring means, so that the volume of liquid in said intermediate chamber remain substantially constant; and a data collecting unit, for collecting chart data on the quantity of liquid to be dispensed by said dispenser device, said data collecting unit having means to correlate data collected from said monitoring means with data generated by said data collecting unit so that the liquid may be automatically dispensed once the data collecting means has acquired the information on the quantity of liquid to be dispensed. Said data collecting unit could preferably be either a keyboard, for manually entering the data into said computer; or a bar code scanner, for electronically collecting the data from a bar code and entering this data into said computer.

It is envisioned that said first biasing means include a fluid connection pipe member between said storage tank and said intermediate chamber that allows gravity borne liquid flow from said storage tank into said intermediate chamber due to a position of said storage tank vertically higher than the position of said intermediate chamber.

Advantageously, said first fluid connection pipe member linking said storage tank and said intermediate chamber comprises at least one elbowed section to reduce the liquid velocity in said pipe.

Said second biasing means could include a fluid connection pipe member mounted downstream of said intermediate chamber outlet port, that allows gravity-borne liquid flow from said storage tank into said intermediate chamber due to a position of said intermediate chamber vertically higher than the position of said outlet port, said fluid connection pipe member further allowing pressure-borne liquid flow under the pressure applied by the liquid in said intermediate chamber overlying said outlet port.

The invention also relates to a gravity dispenser device for dispensing a precise quantity of liquid, into a receptacle comprising: a) a storage tank, for holding a provision of the liquid and having a top refill intake port and a bottom first liquid outlet port; b) an intermediate chamber, fluidingly connected to said storage tank outlet port vertically under same so that the liquid in said storage tank be biased under the gravity force towards said intermediate chamber, said intermediate chamber being destined to hold a substantially constant quantity of liquid, said intermediate chamber comprising a second liquid outlet port located vertically under it, for allowing liquid flow therethrough under the gravity force and under the pressure of the liquid overlying said second outlet port; c) a first valve, for controlling the liquid flow between said storage tank first outlet port and said intermediate chamber; d) a second valve, for controlling the liquid flow between said intermediate chamber second outlet port and said receptacle; e) monitoring means, for monitoring the quantity of liquid in said intermediate chamber while liquid dispensing flow occurs; f) electronic control means, linked to said first and second valves and to said monitoring means for allowing automatic control thereof by said control means; wherein a precise quantity of liquid can be dispensed through said second outlet port by activating said second valve by means of said control means, and by maintaining a constant liquid pressure and volume in said intermediate chamber resulting from the monitoring of the liquid therein by means of said monitoring means which inform said control means of either one of a volume and a pressure variation in said intermediate chamber, which allows liquid refill of said intermediate chamber by said control means correspondingly activating said first valve for refilling said intermediate chamber with liquid.

The invention also concerns a method for dispensing a precise quantity of liquid by means of a dispenser, the dispenser of the type comprising a storage tank at least partially filled with the liquid, an intermediate chamber at least partially filled with the liquid, first biasing means for baising the liquid from said storage tank to said intermediate chamber, second biasing means for biasing the liquid out of said intermediate chamber and dispensing the liquid, a first valve for controlling the access of the liquid from the storage tank to the intermediate chamber, a second valve for controlling the liquid flow out of the intermediate chamber, and monitoring means for monitoring the quantity of liquid in said intermediate chamber, said method comprising the following steps: a) activating the second valve for allowing flow of a precise quantity of the liquid therethrough out of said dispenser; b) monitoring the quantity of liquid in said intermediate chamber by means of said monitoring means; c) activating said first valve so as to allow liquid flow from said storage tank into said intermediate chamber, so that the quantity of liquid in the intermediate chamber remain constant.

In the case of this method, the dispenser could have data collecting means connected to computerized electronic control means for automatically controlling said first and second valves and for receiving electronic signals from said monitoring means, said method further comprising the following step before step (a):

aa) electronically collecting data concerning the quantity of liquid to be dispensed by the dispenser.

BRIEF DESCRIPTION OF THE DRAWINGS

The single annexed drawing figure is a perspective view of the precision liquid dispensing device according to the preferred embodiment of the invention.

DETAILED DESCRIPTION OF THE PREFERRED EMBODIMENT

In the annexed figure of drawings, there is shown a liquid dispenser 10 according to the invention. Dispenser 10 comprises a storage tank 12 in which a rather large quantity of liquid to be dispensed may be stored. The dispenser 10 of the invention is especially, though not exclusively, designed for use in the pharmaceutical industry, in preparing medication comprising a certain small quantity of concentrated solid medicated powder which is to be diluted by adding distilled water. Thus, the liquid in tank 12 will preferably be distilled water.

Although tank 12 is shown to be cylindrical in the drawing, it is understood that any suitable shape could be acceptable therefor. Also, tank 12 comprises a a top wall 13, with a refill inlet port covered with a removable closure cap 14, and a bottom funnel shape wall 15, having an outlet port 15a.

Storage tank 12 is fluidingly connected to an intermediate chamber 16 via its outlet port 15a, by means of two consecutive pipe sections 18 and 20 interconnected by an intermediate valve unit 22. Valve 22 controls the gravity flow of the distilled water from storage tank 12 to intermediate chamber 16. Storage tank 12 is located in vertical register with intermediate chamber 16, so that the gravity force continually bias the liquid from tank 12 to chamber 16. Thus, valve 22 entirely controls the distilled water flow into chamber 16.

Chamber 16 is shown to be box-shaped, but it could well be of any suitable shape, as long as it remains functional in view of the present specification. Chamber 16 comprises a lower liquid outlet port 24 located at its vertically lowermost position, to allow the liquid therein to flow under the gravity force, i.e. under the hydrostatic pressure of the body of liquid located over outlet port 24, through port 24. Outlet port 24 is fluidingly connected to a first and second nozzle sections 26 and 28 interconnected by a second intermediate valve unit 30. The dispenser device 10 dispenses liquid at the free lower end 28a of second nozzle section 28, into a suitable receptacle 32 spacedly underlying nozzle 28. The liquid flow from chamber 16 into receptacle 32 is entirely controlled by second valve 30.

Valve units 22, 30, may be of any make suitable for water flow control. One preferred valve member would be the 110 volts "skinner" valve manufactured by the Honeywell company. This skinner valve has a stainless steel housing, and a TEFLON covered plunger.

Dispenser device 10 further comprises a small computer 34 which is electronically connected to the first and second valves 22, 30, by separate lines 31, 33, and to a buoyant float gauge 36 inside chamber 16 by line 37. Gauge 36 is hingedly attached inside chamber 16 to its lateral side wall 16a. Computer 34 electronically controls the operation of valves 22 and 30. Data collecting means (not shown) are used to collect data and transmit it to the computer 34 concerning either the quantity of water to be dispensed, or the medecine to be produced; in the latter case, a computerized data base must be accessed to determine the quantity of liquid required to make a particular medicinal mixture. The data collecting means can be any suitable device, such as a conventional alphanumeric keyboard, a computer mouse and screen combination or a bar code scanner.

Float gauge 36 can pivot so as to register with the liquid level inside chamber 16.

In use, to dispense a precise quantity of liquid in receptacle 32, the data concerning the required quantity of liquid is collected by the computer 34 through the instrumentality of the data collecting means. A signal is then sent to second valve 30 to allow liquid flow therethrough into receptacle 32 from intermediate chamber 16. The liquid level therein will thus lower slightly under the outflow of the liquid. Buoyant gauge 36 will thus pivot downwardly responsively to liquid level motion, and a signal will accordingly be sent to computer 30, that the level has changed inside chamber 16. Computer 30 will in turn responsively send a signal to first valve 22, to allow liquid flow from storage tank 12 into chamber 16, until the level of liquid returns to its desired original level once again.

The maximum liquid flow rate of outlet port 24 should be equal to or lesser than the maximum liquid flow rate into chamber 16, so that the liquid flow rate entering chamber 16 will always equally compensate the liquid flow rate out of chamber 16. This way, through the signal sent by the monitoring gauge 36, the quantity of liquid inside chamber 16 can remain always substantially constant. An easy way to ensure this flow rate difference is to provide the first valve 22 with a diametrally larger liquid passage than the second valve 30.

The purpose of this system is that the hydrostatic pressure on the outpouring liquid remain always constant. This way, the liquid outflow rate can be predicted very precisely, and thus very precise quantities of liquid can be automatically dispensed. Indeed, the inner liquid passage opening (not shown) of the second valve 30 having a known diameter and the pressure applied by the overlying liquid in chamber 16 on the downflowing liquid being also known, the computer need only keep the second valve 30 open for a precise time period, to obtain a precise quantity of dispensed liquid.

It will be seen in the annexed single figure that the pipe sections 18, 20, together with valve 22, form two right angle elbows, and the lower end 20a of second pipe section 20 extends through the top wall 16c of chamber and downwardly into chamber 16, to freely open in spaced proximity to its bottom wall 16b, at a distance from outlet port 24. This design of the pipes 18, 20 and their position are advantageous, since the elbows in the upper pipe outlay help prevent a more important vertical column liquid pressure build-up due to the vertical drop of the water into chamber 16; and the position of the pipe lower end 20a away from port 24 prevents the liquid from flowing with a significant pressure directly into port 24. Both these characteristics of the invention help to control the pressure on the liquid flowing out of port 24.

There may be very slight variations in the quantity of liquid inside intermediate chamber 16, since for example there may exist a small response time between the moment when the second valve dispenses its first drops of liquid and the moment when the first valve allows passage of the filling liquid from tank 12. However, the pressure applied on the outflowing liquid by the overlying liquid column inside chamber 16 over outlet port 24, is proportional to the height of this liquid column. It is thus advantageous to provide an intermediate chamber 16 containing a rather high water body relative to the pivotal response displacement of the pivoting float gauge 36. Thus, the possible small variation of the water body height will not significantly influence the speed at which the liquid is dispatched through the outlet port due to the effective very small value of this height variation relative to the overall height of the liquid contained in chamber 16.

The dispenser according to the invention is thus a very precise device that is simple in its operation, less prone to breakage due to its simplicity and also much less expensive than many devices that have a similar purpose.

It is understood that the invention as shown in the annexed drawing and as explained hereinabove is the best mode to carry out the invention, but it is not exclusive as to the scope of the invention. Indeed, any minor modifications brought to this invention that do not deviate from the scope thereof, are considered to be included therein.

For example, although only a gravity dispenser has been described herein, it is understood that other liquid biasing means could be used than the combination of the gravity force and the overlying liquid pressure, such as a liquid pump. However, the use of the gravity force not only procures the best results, but it is also the simplest and least expensive method of acquiring these advantageous and unexpected results.

Also, a buoyant gauge 36 has been used to monitor the liquid quantity by monitoring its level in the intermediate chamber 16, but other suitable monitoring means could be used as well. For example, optical sensor means could be used in conjunction with manual control of the first valve for feeding the intermediate chamber 16 with liquid, although this may not be as precise. Also, internal air pressure detection means, such as mercury columns, could be used to determine whether the quantity of liquid inside chamber 16 varies.

We claim:

1. A liquid metering and dispensing device for dispensing a precisely metered volume of liquid into a receptacle for diluting a solid compound at a specified dosage, said device comprising:

a) a storage tank, for holding a provision of the liquid, and having a first outlet port and a liquid supply intake port;

b) an intermediate chamber, having an inlet fluidingly connected to said storage tank outlet port, and a second outlet port for dispensing liquid into the receptacle;

c) first biasing means for biasing the liquid from said storage tank through said first outlet port into said intermediate chamber;

d) second biasing means for biasing the liquid out of said intermediate chamber through said second outlet port and into the receptacle;

e) a first valve member, for controlling the liquid flow between said storage tank and said intermediate chamber;

f) a second valve member, for controlling the liquid flow between said intermediate chamber and said receptacle;

g) monitoring means, for monitoring the volume of liquid in said intermediate chamber while liquid dispensing flow occurs; and h) valve actuating means, operatively connecting said monitoring means to said first and second valve members for sequential opening and closure of said first and second valve members, responsively to liquid level fluctuations detected by said monitoring means upon opening of said second valve members; wherein a precisely metered volume of liquid can be dispensed by energizing said actuating means to open sequentially said valve members, and by maintaining a constant liquid pressure and volume in said intermediate chamber resulting from the monitoring of the liquid therein which allows liquid refill of said intermediate chamber from said storage tank.

2. A dispenser device as defined in claim 1, wherein said monitoring means includes a buoyant gauge located in said intermediate chamber and movingly responsive to the level of liquid therein.

3. A dispenser device as defined in claim 2, wherein said monitoring means comprises a data processing unit, electronically connected to said buoyant gauge, actuating means, and to said first and second valves, for automatically energizing said actuating means for controlling said second valve and consequently the quantity of liquid dispensed by said intermediate chamber, and for simultaneously automatically controlling said first valve according to the signal of said monitoring means, so that the volume of liquid in said intermediate chamber remain substantially constant; and a data collecting unit, for collecting chart data on the quantity of liquid to be dispensed by said dispenser device, said data collecting unit having means to correlate data collected from said monitoring means with data generated by said data collecting unit so that the liquid may be automatically dispensed once the data collecting means has acquired the information on the quantity of liquid to be dispensed.

4. A dispenser device as defined in claim 3, wherein said data collecting unit is a keyboard for manually entering the data into said computer.

5. A dispenser device as defined in claim 3, wherein said data collecting unit is a bar code scanner for electronically collecting the data from a bar code and entering this data into said computer.

6. A dispenser device as defined in claim 1, wherein said first biasing means includes a fluid connection pipe member between said storage tank and said intermediate chamber that allows gravity borne liquid flow from said storage tank into said intermediate chamber due to a position of said storage tank vertically higher than the position of said intermediate chamber.

7. A dispenser device as defined in claim 1, wherein said first fluid connection pipe member linking said storage tank and said intermediate chamber comprises at least one elbowed section to reduce the liquid velocity in said pipe.

8. A dispenser device as defined in claim 1, wherein said second biasing means includes a fluid connection pipe member mounted downstream of said intermediate chamber outlet port, that allows gravity-borne liquid flow from said storage tank into said intermediate chamber due to a position of said intermediate chamber vertically higher than the position of said outlet port, said fluid connection pipe member further allowing pressure-borne liquid flow under the pressure applied by the liquid in said intermediate chamber overlying said outlet port.

9. A gravity dispenser device for dispensing a precise quantity of liquid, into a receptacle comprising:
   a) a storage tank, for holding a provision of the liquid and having a top refill intake port and a bottom first liquid outlet port;
   b) an intermediate chamber, fluidly connected to said storage tank outlet port vertically under same so that the liquid in said storage tank be biased under the gravity force towards said intermediate chamber, said intermediate chamber being destined to hold a substantially constant quantity of liquid, said intermediate chamber comprising a second liquid outlet port located vertically under it, for allowing liquid flow therethrough under the gravity force and under the pressure of the liquid overlying said second outlet port;
   c) a first valve, for controlling the liquid flow between said storage tank first outlet port and said intermediate chamber;
   d) a second valve, for controlling the liquid flow between said intermediate chamber second outlet port and said receptacle;
   e) monitoring means, for monitoring the quantity of liquid in said intermediate chamber while liquid dispensing flow occurs;
   f) computerized electronic control means, linked to said first and second valves and to said monitoring means for allowing automatic control thereof by said control means; wherein a precise quantity of liquid can be dispensed through said second outlet port by activating said second valve by means of said control means, and by maintaining a constant liquid pressure and volume in said intermediate chamber resulting from the monitoring of the liquid therein by means of said monitoring means which inform said control means of either one of a volume and a pressure variation in said intermediate chamber, which allows liquid refill of said intermediate chamber by said control means correspondingly activating said first valve for refilling said intermediate chamber with liquid.

10. A method for dispensing a precise quantity of liquid by means of a dispenser, the dispenser of the type comprising a storage tank at least partially filled with the liquid, an intermediate chamber at least partially filled with the liquid, first biasing means for baising the liquid from said storage tank to said intermediate chamber, second biasing means for biasing the liquid out of said intermediate chamber and dispensing the liquid, a first valve for controlling the access of the liquid from the storage tank to the intermediate chamber, a second valve for controlling the liquid flow out of the intermediate chamber, and monitoring means for monitoring the quantity of liquid in said intermediate chamber, said method comprising the following steps:
   a) activating the second valve for allowing flow of a precise quantity of the liquid therethrough out of said dispenser;
   b) monitoring the quantity of liquid in said intermediate chamber by means of said monitoring means;
   c) activating said first valve so as to allow liquid flow from said storage tank into said intermediate chamber, so that the quantity of liquid in the intermediate chamber remain constant.

11. A method as defined in claim 10, wherein the dispenser has data collecting means connected to computerized electronic control means for automatically controlling said first and second valves and for receiving electronic signals from said monitoring means, said method further comprising the following step before step (a):
   aa) electronically collecting data concerning the quantity of liquid to be dispensed by the dispenser.

* * * * *